United States Patent
Koch et al.

(10) Patent No.: US 7,563,628 B2
(45) Date of Patent: Jul. 21, 2009

(54) FABRICATION OF OPTICAL WAVEGUIDE DEVICES

(75) Inventors: Thomas L. Koch, Califon, NJ (US);
Robert M. Pafchek, Blandon, PA (US);
Mark A. Webster, Bethlehem, PA (US)

(73) Assignee: Lehigh University, Bethlehem, PA (US)

( * ) Notice: Subject to any disclaimer, the term of this patent is extended or adjusted under 35 U.S.C. 154(b) by 317 days.

(21) Appl. No.: 11/265,931

(22) Filed: Nov. 3, 2005

(65) Prior Publication Data

US 2006/0098928 A1 May 11, 2006

Related U.S. Application Data

(60) Provisional application No. 60/626,739, filed on Nov. 10, 2004.

(51) Int. Cl.
*H01L 21/00* (2006.01)
(52) U.S. Cl. ............... 438/31; 438/29; 438/770; 438/778; 257/E21.082; 257/E21.282
(58) Field of Classification Search .............. 438/35, 438/942; 257/E21.082, E21.282, E21.283, 257/E21.287
See application file for complete search history.

(56) References Cited

U.S. PATENT DOCUMENTS

| | | | | |
|---|---|---|---|---|
| 5,360,982 | A | | 11/1994 | Venhuizen .................. 385/14 |
| 5,917,981 | A | | 6/1999 | Kovacic et al. .............. 385/131 |
| 6,618,537 | B2 | * | 9/2003 | Temkin et al. .............. 385/132 |
| 6,850,683 | B2 | * | 2/2005 | Lee et al. .................... 385/129 |
| 6,890,450 | B2 | * | 5/2005 | Naydenkov et al. ........... 216/24 |
| 6,998,224 | B1 | * | 2/2006 | Kubacki .................... 430/321 |
| 7,076,135 | B2 | * | 7/2006 | Yamada et al. ................ 385/43 |
| 7,118,682 | B2 | * | 10/2006 | Patel et al. ................... 216/24 |
| 2002/0031321 | A1 | | 3/2002 | Lee et al. .................... 385/129 |
| 2002/0064897 | A1 | * | 5/2002 | Bazylenko .................. 438/31 |
| 2002/0074308 | A1 | * | 6/2002 | Beguin ........................ 216/2 |
| 2004/0057667 | A1 | * | 3/2004 | Yamada et al. ................ 385/43 |

OTHER PUBLICATIONS

"Effect of Size and Roughness on Light Transmission in a Si/SiO$_2$ Waveguide . . . " by Lee et al, Applied Physics Letters, vol. 77, pp. 1617-1619 (Sep. 11, 2000) and p. 2258 (Oct. 2, 2000).
"Fabrication of SiGe Optical Waveguides Using VLSI Processing Techniques" by Pearson et al, Journal of Lightwave Technology, vol. 19, pp. 363-370 (Mar. 2001).
"Fabrication of Ultra-Low Loss Si/SiO$_2$ Waveguides by Roughness Reduction" by Lee et al, Optics Letters, vol. 26, pp. 1888-1890 (Dec. 1, 2001).

* cited by examiner

*Primary Examiner*—Alexander G Ghyka
*Assistant Examiner*—Cheung Lee

(57) ABSTRACT

Disclosed is a method of fabricating an optical waveguide device including the steps of forming a mask over a waveguide core material layer so as to leave a portion of the layer exposed, and exposing the structure to an oxidizing environment to form an oxide layer on the waveguide core material layer at least in the exposed portion thereby defining the lateral dimension of the waveguide core. The resulting waveguide core has extremely smooth surfaces for low optical losses.

10 Claims, 4 Drawing Sheets

FABRICATION OF OPTICAL WAVEGUIDE DEVICES

CROSS REFERENCE TO RELATED APPLICATION

This application claims the benefit of provisional patent application No. 60/626,739 filed Nov. 10, 2004, which is incorporated by reference herein.

This invention was made under a contract with an agency of the United States Government, and the United States Government has certain rights in the invention.

FIELD OF THE INVENTION

The present invention relates generally to optical waveguide devices and, more particularly, to a method of fabricating optical waveguide devices with low losses.

BACKGROUND OF THE INVENTION

Silicon photonics based on CMOS processing technology will potentially enable the integration of optical devices with electronics on a single chip. Furthermore, the high-index difference between Si and $SiO_2$ from the silicon-on-insulator (SOI) material system, together with suitable optical waveguide geometry, provides for strong-confinement waveguides with very low bending losses from a small bending radius. This allows for a very high density of optical devices and compact integrated functionally that could be inherently scalable for high-volume, low-cost production by utilizing highly mature fabrication and processing techniques developed for the VLSI microelectronics industry. However, one consequence of the high-index contrast and strong confinement optical waveguide system is the high propagation loss caused by surface or interface roughness introduced during the waveguide fabrication process by waveguide definition (photolithography, etching or other fabrication steps). The ability to fabricate very low-loss optical waveguides in silicon is an important step for silicon photonics to reach its full potential.

The currently used common fabrication techniques for producing silicon waveguides are reactive ion etching (RIE), and wet-chemical etching (both anisotropic and isotropic). Reactive-ion etching is used for achieving sub-micron features with high-resolution in the silicon processing industry. The process is anisotropic and can be used to produce rib and strip waveguides of the geometries described in more detail below in relation to FIGS. 1-3. The process produces vertical side walls, but will transfer any roughness in the preceding mask layer (introduced, say, from unintentional and often unavoidable variations in the photoresist side-walls during the photolithography step) and also introduce roughness inherent to the etching process itself. The surface roughness is typically on the 10 nm scale, and although this seems small, it is significant enough to cause propagation losses on the order of 2-20 dB/cm for strong-confinement strip waveguides. The impact on large-area rib waveguides is less severe. Using anisotropic wet-chemical silicon etchants such as potassium hydroxide (KOH) can in theory produce waveguide sidewalls that are atomically smooth. However, the sidewalls are no longer vertical, which has little impact on the waveguiding properties, but the sidewalls are limited to well-defined crystal directions. This limits the optical circuit geometry to straight waveguides only, which is of limited practical use. High-density optical circuits will require curves, S-bends, and waveguides at arbitrary angles. Finally, it is also possible to use an isotropic wet-chemical silicon etchant like the HNA etchant (hydrofluoric acid or ammonium fluoride, nitric acid, and acetic acid or water) for the optical waveguides. This etchant can produce relatively smooth surfaces but typically not as smooth as the original, unetched silicon wafer surface. Moreover, it is usually difficult to control the etching rate for precise rib height control using this process.

A recently proposed solution to the RIE induced surface roughness problem for the strip waveguide geometry is that of oxidation smoothing, described, for example, in Lee et al, "Fabrication of Ultralow-loss Si/SiO2 Waveguides by Roughness Reduction," Optics Letters, vol. 26, pp 1888-1890 (December, 2001). There, the rough silicon surface is oxidized in an oxidizing environment, such as at a temperature of 1000 deg C. in an oxygen ($O_2$ with/without $H_2O$) atmosphere for an extended time of 30-60 min. The principle there relies on the result that the convex points in the rough surface react faster than the concave points, thus leading to an overall smoothing effect. (See also, U.S. Patent Publication 2002/0031321, published Mar. 14, 2002.) The resultant $SiO_2$ layer formed on this surface can be etched away in HF. It has been shown that this process can reduce the root mean square (rms) surface roughness of an RIE silicon waveguide from $\sigma=10$ nm to about $\sigma=2$ mm. This results in a propagation loss for the strip waveguide being reduced from about 32 dB/cm after RIE formation to 0.8 dB/cm after oxidation smoothing. This process does not significantly affect the correlation length Lc of any rough surfaces which is also an important parameter in the propagation loss behavior of an optical waveguide. The correlation length, while a precise mathematical construct, can generally be understood to be the length over which a roughness feature extends along the waveguide length. It should be noted that in this technique, the waveguide is pre-existing and has been formed using some form of etching process as described above, and thus will start with some undesirable amount of surface roughness from that process.

Other proposals have been made regarding formation of optical waveguides using oxidation of silicon. For example, Pearson, et al "Fabrication of SiGe Optical Waveguides Using VLSI Processing Techniques," Journal of Lightwave Technology, vol. 19, pp 363-370 (March 2001) suggests oxidation of a silicon cladding layer by wet oxidation. Pearson's technique is directed to waveguides with a SiGe core and Si cladding, which produces a small difference in index of refraction between the core and cladding. This, in turn, requires a large thickness of the core and cladding (at least 0.5 microns). To provide guiding in these large-dimension guides, Pearson et al use a process which oxidizes the cladding layers of the guide in a region removed from the core of the guide. It is understood by those skilled in the art that the waveguide core is a higher index medium where the electromagnetic field is propagating, while the cladding is a lower index medium where the electromagnetic field is evanescently decaying serving to confine the electromagnetic field in the core by total internal reflection. The incorporation of a SiGe core, and the corresponding larger waveguide sizes that must be used in the weakly-guided structures defined by patterning only the cladding, are not optimal for many integrated optoelectronic applications. Further, Pearson's technique is used to reduce dislocation density in the SiGe core, and does not address the smoothing or other properties of the core-cladding interface, which in their case is an epitaxially grown SiGe—Si interface. In a similar proposal, U.S. Pat. No. 5,917,981 issued to Kovacic et al, involves fabricating waveguides including the step of wet oxidation of a silicon cladding layer. Again, this proposal is directed to the low index of refraction difference structures ($\Delta n \sim 0.05$) with large thicknesses of silicon (typically about 1 micron). (See, e.g., column 7, lines 22-27 of the patent.)

Finally, U.S. Pat. No. 5,360,982 issued to Venhuizen discloses fabrication of a device with a groove-shaped waveguide, where the groove is formed with smooth surfaces by virtue of oxidation of a silicon substrate. This proposal is also directed to fairly large dimensions. For example, the groove depth varies from 0.1 to 1 micron. (See, e.g., col. 2 lines 44-49.) Further, the waveguide material is a polymer which is formed after the groove, thus requiring two steps for smoothing and waveguide formation.

It is, therefore, desirable to fabricate a waveguide device with a large difference in index of refraction between the core and cladding for tight optical confinement using a minimum number of steps while producing a smooth core-cladding interface to achieve a low loss.

SUMMARY OF THE INVENTION

To achieve these and other objects, and in view of its purposes, the present invention provides a method of fabricating an optical waveguide device which includes a core having a lateral dimension, the method including the steps of forming a mask over a waveguide core material layer so as to leave a portion of the layer exposed, and exposing the structure to an oxidizing environment to form an oxide layer on the waveguide core material layer at least in the exposed portion thereby defining the lateral dimension of the waveguide core.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice in the semiconductor industry, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1:
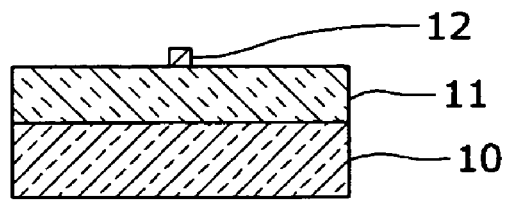
FIGS. 1-3 are cross sectional views of different waveguide structures that can be implemented in high index contrast material systems.
Figure 2:
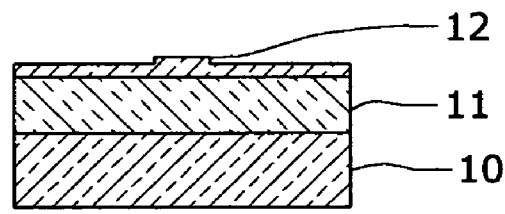
Figure 3:
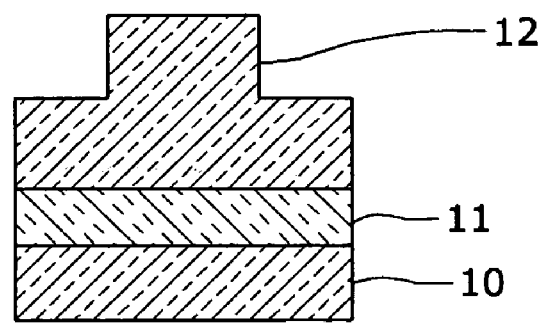

Referring now to the drawing, wherein like reference numerals refer to like elements throughout, FIGS. 1-3 illustrate optical waveguide devices which may be fabricated in accordance with the invention. Each device includes a substrate, 10, which may typically be silicon, a buried oxide layer (BOX), 11, which may typically be $SiO_2$, and a waveguide core, 12, which may typically be silicon. FIG. 1 is typically designated a "strip" waveguide, FIG. 2 is typically designated a "shallow rib" waveguide, and FIG. 3 is typically referred to as a "large area rib" waveguide. By suitable choice of the waveguide geometry, each of these structures can be designed as single-mode waveguides for a specific wavelength of interest. A typical, free-space wavelength of interest is $\lambda o=1$-$2$ microns (in vacuum), although this is not meant to be restrictive. To classify the various geometries for the high index contrast silicon waveguides, we use as a scale factor $\lambda=\lambda o/n$ where n is the index of refraction in the waveguide core. For a typical example of $\lambda o=1.55$ microns and a silicon core with an index n~3.5, we would have $\lambda$~0.4 microns.

We will use the following approximate descriptions or nomenclature for the various waveguide geometries: (a) a strip waveguide usually has both width and height$<\lambda$ (b) a shallow rib waveguide usually has width~$\lambda$, height$<\lambda$, and (c) a large-area rib waveguide has width$>>\lambda$ and height$>>\lambda$. These descriptions are representative, but not restrictive. For example, it is well known that a shallow rib guide can be made with widths both greater than $\lambda$ and less than $\lambda$.

To enable compact optical circuits, preferred waveguides have both a low propagation loss and are capable of supporting low loss small radius bends. The bending loss performance of a particular waveguide is solely dependent upon the waveguide geometry (height, width, etc) and its index contrast between the core and cladding. These parameters are also constrained by the desirability of single-mode operation. Generally speaking, high index contrast between the core and cladding requires smaller waveguide dimensions to provide single mode operation. The propagation loss from interface roughness, on the other hand, is dependent on both the geometric dimensions and design of the waveguide, as well as the fabrication induced surface roughness properties of the waveguide. The surface roughness is a usually random quantity, and in this case can be statistically characterized by a root-mean-square (rms) roughness a and a correlation length Lc. Unfortunately, for a specific value of surface roughness and a required bending radius (say, to achieve a desired optical circuit density on a chip), the waveguide geometry required for a low bending loss leads to a large propagation loss, and conversely, for low propagation loss leads to a high bending loss. Thus to improve the overall performance of optical waveguides to give both a low propagation loss and small bending loss for a given bending radius, it is desirable to develop a fabrication technique that leads to low values of surface roughness but is also amenable to small geometries suitable for moderate to low bending loss.

It can be shown that the propagation loss ($\alpha$) is approximately proportional to $\Delta n^2$ where $\Delta n$ is the index contrast between core and cladding, and is also approximately proportional to $\sigma^2$. Thus, for the silicon waveguide system of interest here where $\Delta n$ is approximately equal to 2, the surface roughness losses will be much greater than for a low contrast system with a typical value of $\Delta n$ approximately equal to 0.01. This clearly demonstrates the need for a low value of surface roughness for high index waveguide systems such as silicon waveguides. The dependence on the correlation length $L_c$ is more complicated, but is still a significant parameter to be controlled.

There is considerable motivation in silicon photonics for producing not only low-loss optical waveguides, but to also integrate actives devices such as sources, modulators, switches, tunable filters, detectors, etc., and all being compatible CMOS processing technology. By its very nature, the CMOS processing technology is planar, thus planar-like waveguide geometries are most suited for CMOS compatibility. The large-area rib waveguides of FIG. 3 are better suited to coupling with single mode optical fibers due to their large mode size, but are not as likely to be compatible with planar CMOS geometries. The strip waveguide of FIG. 1 can be fabricated in a manner that is somewhat compatible with CMOS processing, and it may be suited for compact routing of an optical signal on an optical chip as well as various passive functions. Also such strip waveguides may be suited to some active functions, but we believe that it is generally more difficult to incorporate a large variety of active functionality into such waveguides. Therefore, we propose that the shallow rib waveguide geometry of FIG. 2, in addition to being compatible with planar CMOS processing, should also offer a number of key benefits for some silicon photonic functionality and applications.

Firstly, we believe that the lowest losses, with CMOS compatibility and reasonable degrees of compactness, should be achievable in such shallow rib guides for applications where losses are critical. With extremely low-loss waveguides, high-Q resonator structures are possible, and with low loss couplers, very sophisticated optical filtering functions are possible. These can be accomplished by cascading ring resonators, using arrayed-waveguide-gratings, and/or Bragg grating-based resonators in a variety of fashions to produce desired bandpass, band-reject, and add drop filters for wavelength-division-multiplexing or sensor applications. Finally, with extremely low-loss waveguides, high-Q resonator structures are possible, which enable very high optical intensities in small silicon waveguides which allow nonlinear effects in silicon such as Raman scattering to be efficiently utilized for very low input powers. This can enable efficient Raman optical amplifiers and Raman lasers to be realized on a silicon photonic chip. Parametric amplification and lasing should also be possible in such high-Q resonators.

As another example, the more planar geometry of such a shallow rib guide is more amenable to forming well-controlled p-n junctions in the waveguide region for producing electrically active devices using field depletion, enhancement, or even injected carrier effects. Furthermore, by incorporating an optically active species (such as erbium, neodymium, ytterbium, praseodymium, holmium, etc, but not limited to these) in oxide layers surrounding, or possibly embedded in, the core of the waveguide (as an illustrative example), it may be possible to achieve optical gain and potentially laser operation through either electrical or optical pumping of the active species. This again highlights the desirability of extremely low-loss optical waveguides for achieving net optical gain from the active species because the lower the propagation loss, the lower the net gain that is required for lasing threshold. Since it is anticipated that high gain in these structures will be difficult to achieve, low loss is critical.

One of the desirable features of the fabrication process as described in this application is the ability to have a controllable degree of guiding. Thus, in circumstances where a strip waveguide as in FIG. 1 is more suitable, the process can be tailored to produce such a result. Thus any result between FIG. 1 and FIG. 2 should be achievable, as will be apparent in the following description of the inventive process.

Figure 4:
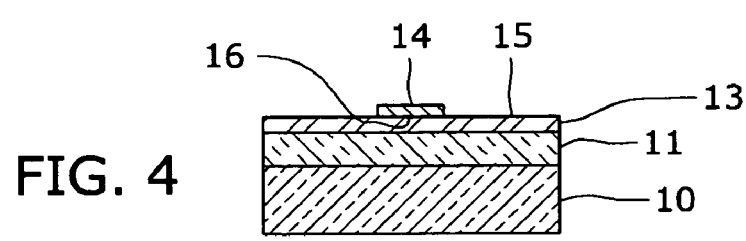
FIGS. 4-9 are cross sectional views of a waveguide device during different stages of fabrication in accordance with an embodiment of the invention.

In accordance with a feature of the invention, the smooth interface produced by thermal oxidation of silicon is used to form extremely low loss silicon optical waveguides in an economical process. It should be emphasized, that this process does not smooth a pre-existing waveguide with rough surfaces, but actually forms the waveguide core itself with smooth surfaces from the beginning. Some example embodiments of this process are shown in FIGS. 4-22, which are described below. In each of these embodiments, the silicon optical waveguide core, 12, is formed on a SOI wafer that has a Si device layer, e.g. 13 of FIG. 4, thickness typically on the scale of 100-500 nm, although this is not intended to be restrictive. This Si layer is atop a buried oxide layer (BOX), 11, that has typical thickness of 0.5-3 microns, although this is also not intended to be restrictive. The waveguide widths (lateral dimensions) are typically in the range of 0.25-2.0 microns, with a rib height of typically 5 nm or greater. These dimensions are typical for obtaining single-mode shallow rib waveguides (or strip waveguides if the rib height equals the Si device layer thickness) at a free-space wavelength of $\lambda_o=1.55$ microns. It is understood that these parameter ranges are not restrictive and in fact will vary for operation at different wavelengths and/or applications, and can also fall outside these ranges and still provide good operation in many circumstances. It will also be appreciated that any other material systems which provide for the propagation of light, have a high index difference, and where the core can be oxidized could benefit from the teachings of the invention. Such materials could be other group IV materials or III-V semiconductors, for example.

In the embodiment illustrated in FIGS. 4-9, fabrication is shown beginning with the silicon substrate, 10, buried oxide, 11, and the silicon device layer, 13, previously described. In the context of this application and in the claims, the device layer, 13, is referred to as the "waveguide core material layer" since the waveguide core will be formed from shaping this layer. An impermeable mask layer, 14, is deposited and patterned on the waveguide core material layer, 13. The mask layer is chosen to be relatively impermeable to oxygen (or the oxidizing species) during the oxidation process. This mask can be chosen to be compatible with CMOS processing technology, one example being silicon nitride ($Si_3N_4$). The impermeable mask may consist of layers of several different materials such as $SiO_2$ and $Si_3N_4$ where the oxide layer is deposited first and then the nitride layer. This may be done for adhesion and film stress issues experienced during the oxidation process. Another example could be another dielectric doped with, for example, erbium, (to achieve optical gain), or any other optically active species that is left in place after the waveguide forming oxidation process. This way, a self-aligning waveguide-with-gain formation process is realized. The mask can be patterned by standard photolithographic processes to expose a portion, 15, of the waveguide core material layer, 13, while leaving a portion, 16, of the layer, 13, protected under the mask.

Figure 5:
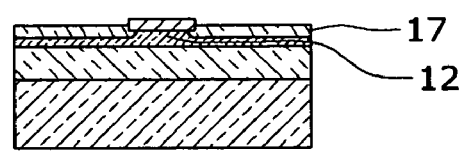
Figure 6:
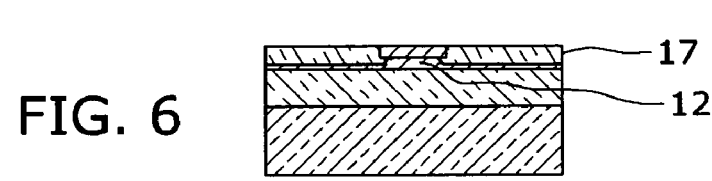
Figure 7:
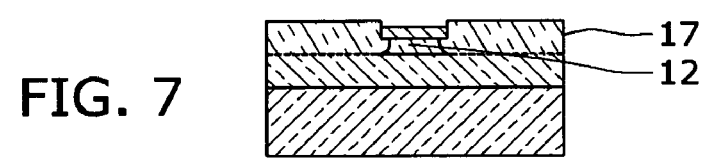

As illustrated in FIG. 5, a layer, 17, of $SiO_2$ is formed on the exposed portion, 15, of the waveguide material layer, 13, by oxidizing the exposed silicon surface. This oxidation can be performed in a thermal oxidation furnace or by rapid thermal annealing (RTA), both of which are standard in CMOS processing. It is understood that there are a variety of techniques for oxidizing the surface of the silicon, and these processes are not meant to be restrictive. For example, another scheme, such as using nitric acid ($HNO_3$) to oxidize the exposed silicon may be advantageous in some applications. This could be particularly desirable for applications requiring low temperature processing. The oxide is grown to a thickness where a desired amount of silicon is oxidized. The portion, 16, under the mask defines the waveguide core, 12. The amount of silicon oxidized can be controlled to give a very shallow rib height, as illustrated in FIG. 5, or a very deep rib height as illustrated in FIG. 6. It is also possible to oxidize all the exposed silicon down to the BOX layer, 11, as illustrated in FIG. 7, thus forming a strip waveguide. In all three cases, the sidewalls of the waveguide will be very smooth due to the formation of the oxide layer, 17. It will also be appreciated that the dimensions of the waveguide core, 12, are formed simultaneously with the oxide, 17, during the oxidation process, thus eliminating a separate step of waveguide formation existing in some prior art processes.

As an illustrative example for performing a thermal oxidation in a furnace, temperatures in the range of 900-1000 deg C. in an atmosphere of dry-$O_2$ for a time sufficient to oxidize the desired amount of exposed silicon (typically in the range of 30-120 minutes) can be used. These temperatures, times, and oxidizing environment are not meant to be restrictive and can be varied to achieve the desired optical waveguide properties within any imposed constraints. For example, it is widely known that a humid environment can accelerate the oxidation process, and oxidation can also be accomplished at low temperatures using wet chemistry such as nitric acid ($HNO_3$) solutions.

Figure 8:
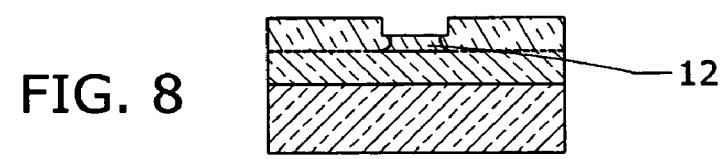
Figure 9:
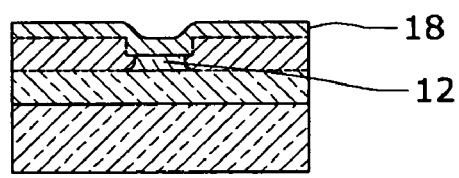

Once the desired rib height is achieved, it is possible to leave the oxide layer, 17, and mask, 14, in place to form the upper cladding for the waveguide. Alternatively, the mask can be removed to use the oxide and air as the upper cladding as illustrated in FIG. 8. As a further alternative, as illustrated in FIG. 9, once the mask is removed, a cladding layer, 18, can be formed over the device by standard techniques. The cladding layer, 18, may be, for example, an oxide which is undoped, or an oxide doped with erbium or some other optically active species. Although removal of the mask and deposition of the cladding are illustrated for the FIG. 7 embodiment, those options are equally applicable to the FIGS. 5 and 6 embodiments.

Figure 10:
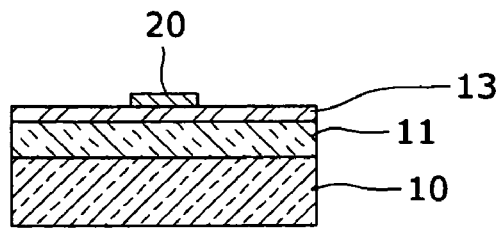
FIGS. 10-15 are cross sectional views of a waveguide device during different stages of fabrication in accordance with another embodiment of the invention.
Figure 11:
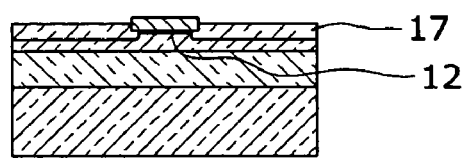
Figure 12:
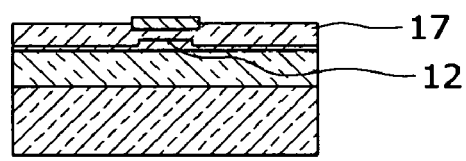
Figure 13:
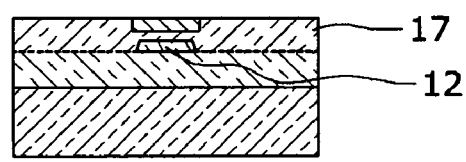
Figure 14:
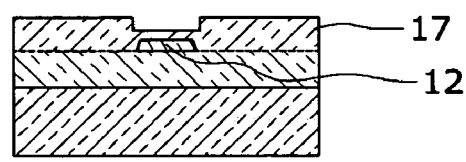
Figure 15:
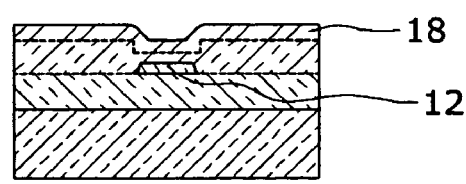
Figure 16:
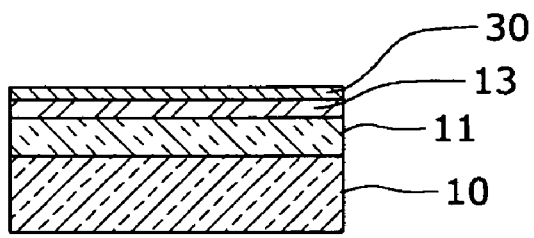
FIGS. 16-22 are cross sectional views of a waveguide device during different stages of fabrication in accordance with yet another embodiment of the invention.

In a further embodiment, illustrated in FIG. 10, a permeable mask material is deposited or otherwise formed on the Si device layer, 13, and then patterned using well-known microelectronic fabrication techniques such as photolithography and etching to form a mask, 20. This mask may allow the oxidizing species (for example, wet or dry oxygen) to diffuse through (permeate) to the underlying silicon and hence oxidize the silicon. An exemplary permeable mask layer could be $SiO_2$ deposited by techniques such as plasma enhanced chemical vapor deposition (PECVD), low pressure chemical vapor deposition (LPCVD), sputtering, or any technique that produces high quality films. Again, the mask material may consist of one or more layers chosen for different degrees of permeability, adhesion, and stress. The mask material can be annealed (for example, raised to an elevated temperature in an inert atmosphere such as dry-nitrogen) for densification and/or to remove residual reactants. As in the previous embodiment, the structure is subjected to an oxidizing atmosphere for a time and temperature sufficient to form an oxide, 17, on the exposed surface of the waveguide core material layer, 13, and define the lateral dimension of a waveguide core, 12, in the area below the mask, 20, as illustrated in FIG. 11. In this embodiment, however, the mask allows the oxidizing species to diffuse through (permeate) to the underlying layer, 13, to oxidize the silicon below the mask as shown in FIGS. 11 and 12. Oxidation can continue until the entire exposed waveguide material layer, 13, is oxidized as illustrated in FIG. 13 in order to from a strip waveguide, 12. As in the previous embodiments, the mask and oxide can be left in place to form the upper cladding. Alternatively, the mask can be removed. FIG. 14, for example, illustrates removal of the mask, 20, and FIG. 15, shows deposition of a cladding layer, 18, over the resulting structure.

An advantage to using a permeable mask is that the film stresses are reduced during the oxidation process leading to reduction in defects introduced. Also, the resulting silicon surface under the mask will be oxidized, thus resulting in a smoother and more rounded waveguide geometry that could potentially have lower propagation losses than a sharp-cornered waveguide. We have found experimentally that the oxidized silicon surface under the permeable mask is just as measurably smooth as a highly polished silicon wafer before any processing. The permeability of this mask layer can be controlled by varying the mask layer thickness. The key point is to choose a mask thickness such that the contrast in silicon oxidation rates between the masked and unmasked regions is great enough to give an acceptable final waveguide rib height after oxidation, and to provide sufficient control of this to give a useful process. As an exemplary embodiment, the permeable mask material could be a thickness in the range of 100-1000 nm of PECVD $SiO_2$, thermally annealed in dry-nitrogen, which we have already found to give a sufficient contrast in the oxidation rates of the exposed and masked silicon regions useful for forming silicon optical waveguides. However, these details are not to be considered restrictive, and are provided here for purposes of illustrating some of the parameters that need to be controlled to achieve a particular result.

Scanning electron microscope (SEM) images were taken of shallow rib waveguides formed using the permeable mask of PECVD $SiO_2$. After oxidation, the mask material and thermally oxidized silicon were removed by etching in HF. The exposed underlying silicon was extremely smooth for both straight waveguides and Y-branch waveguides. Atomic force microscope (AFM) images were also taken of a straight waveguide formed using the permeable mask. The step height of the rib was measured to be approximately 15 nm. The rms surface or interface roughness was measured to be in the range 0.2-0.3 nm, which is about the same value as the highly polished silicon substrate before the oxidation process. Thus, the inventive process is capable of producing SOI waveguides with surface roughness well below the figure of 2 nm reported in prior attempts for creating small dimension, single mode, high contrast strip and rib waveguides.

Figure 17:
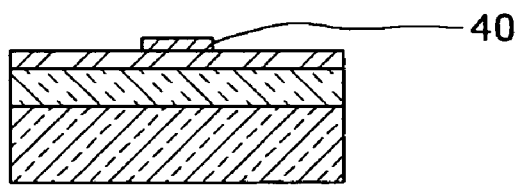
Figure 18:
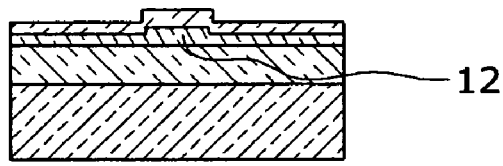
Figure 19:
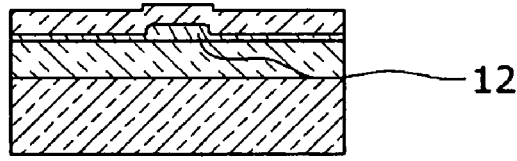
Figure 20:
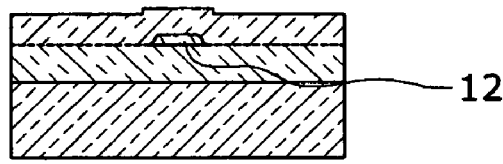
Figure 21:
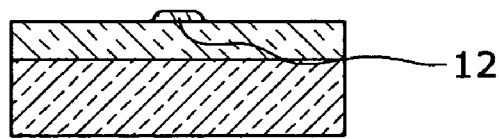
Figure 22:
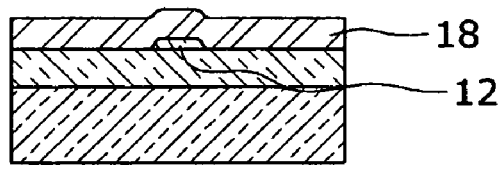

Yet another embodiment of the invention is illustrated in FIGS. 16-22. Rather than depositing a mask layer, the mask is formed by first partially oxidizing the silicon layer, 13, to form a layer of $SiO_2$, 30. The layer, 30, is then patterned using standard techniques to form the mask, 40, as illustrated in FIG. 17. It is possible that either during or after the oxidation process, dopants, such as erbium, that are optically active could be introduced into the mask so that the mask can act as a gain region in the final device. As illustrated in FIGS. 18-20, the oxidation process then continues as previously described to form a shallow rib waveguide core, 12, (FIG. 18), a deeper rib waveguide core (FIG. 19), or a strip waveguide core by completely oxidizing the top silicon layer (FIG. 20). Also, the oxide mask can be removed (FIG. 21), and a cladding layer, 18, deposited over the structure (FIG. 22).

An advantage of the thermal oxidation process is the very tight process control that can be achieved. For example, the oxidation rate of silicon can be controlled by the time and temperature of the furnace (or RTA) to give a resultant thickness within 1 nm. In fact, the film thickness can be monitored in-situ by optical techniques such as ellipsometry to also achieve the desired value. An advantage of the thermal oxidation of the silicon layer over isotropic etching in forming shallow rib waveguides is that the thermal oxidation offers greater control over the rib height.

The thermal oxidation process is also essentially isotropic in nature. This will lead to oxidation occurring under the edge of the waveguide defining mask, and hence lead to non-vertical sidewalls. This is of minimal consequence to the modal behavior of the waveguide, and in fact the round edges may offer lower propagation losses than sharp-corners. The isotropic nature of the thermal oxidation process can offer some further advantages. It will also lead to the waveguide edge definition being smoother than any roughness present in the mask layer defining the waveguide width. This is an important property because it may be difficult to achieve sufficiently small line edge roughness in the photolithography (either in the photomask, the photoresist, or the resultant etched oxidation mask layer) that will lead to extremely low-loss optical waveguides in silicon. By utilizing an isotropic process the effects of this line edge roughness can be mitigated. It is also possible that the mask profile (for the permeable mask material) could be tapered or modified at the edges to enhance and/or control the undercutting of the oxidation process. There may be applications where this is desirable, such as in the junction region of a Y-branch waveguide splitter, where the optical performance can be enhanced.

Although the invention has been described with reference to exemplary embodiments, it is not limited to those embodiments. Rather, the appended claims should be construed to include other variants and embodiments of the invention which may be made by those skilled in the art without departing from the true spirit and scope of the present invention. There can be a number of intermediate layers present in the structure. For example, if an intermediate layer of another material were present between the masking layer and the silicon layer, the inventive process can still work provided that the intermediate layer has some permeability to allow oxidation to proceed to the underlying silicon. Further, while the various embodiments were described in terms of an SOI structure, other materials suitable for waveguide devices may be employed. Finally, it will be noted that the invention is especially useful for structures with a high contrast in index of refraction between the core and cladding ($\Delta n$ in the range of 0.2 to 3) since such structures generally necessitate small dimensions for good optical confinement and are especially susceptible to surface roughness.

What is claimed:

1. A method of fabricating an optical waveguide device which includes a core having a lateral dimension comprising the steps of:

forming a mask which is permeable to an oxidizing species over a waveguide core material layer so as to leave a portion of the layer exposed; and exposing the structure to an oxidizing environment including the oxidizing species to form an oxide layer on the waveguide core material layer in the exposed portion and an oxide layer on the waveguide core layer in a portion of the layer under the mask with a thickness less than the oxide formed in the exposed portion thereby defining the lateral dimension of the waveguide core.

2. The method according to claim 1 wherein the permeable mask comprises $SiO_2$ with a thickness in the range 100-1000 nm.

3. The method according to claim 1 wherein the permeable mask is annealed in dry nitrogen.

4. The method according to claim 1 wherein the oxidizing environment includes a liquid bath, and the structure is exposed to the bath for a time and temperature sufficient to form the oxide layer.

5. The method according to claim 4 wherein the oxidizing environment includes a nitric acid solution.

6. The method according to claim 1 wherein the waveguide core has surfaces adjacent to the oxide with a root mean square roughness, $\sigma$, at or below 0.3 nm.

7. The method according to claim 1 wherein the device further includes a cladding layer, and the difference between the index of refraction of the core and cladding, $\Delta n$, is approximately 2.

8. The method according to claim 1 wherein the device further includes a cladding layer, and the difference between the index of refraction of the core and cladding, $\Delta n$, is within the range 0.2 to 3.

9. The method according to claim 1 wherein the waveguide core material layer comprises silicon with a thickness in the range 100-500 nm.

10. The method according to claim 1 wherein the mask is formed by oxidizing the surface of the waveguide core material layer, and patterning the resulting oxide layer.

* * * * *